United States Patent [19]
Morris

[11] 3,954,345
[45] May 4, 1976

[54] SELF-LOCKING DOWEL PIN

[76] Inventor: Max O. Morris, 582 E. Sunset Highway, Issaquah, Wash. 98027

[22] Filed: Feb. 27, 1975

[21] Appl. No.: 553,797

[52] U.S. Cl. ............................. 403/297; 52/753 E
[51] Int. Cl.² ............................................ E04B 1/48
[58] Field of Search .......... 403/297, 298, 295, 292, 403/293, 290; 52/753 E; 85/67, 72

[56] References Cited
UNITED STATES PATENTS

| | | | |
|---|---|---|---|
| 1,808,318 | 6/1931 | Pleister | 85/72 |
| 2,011,529 | 8/1935 | Shaw | 403/297 |
| 3,217,583 | 11/1965 | Fulop | 85/72 |
| 3,438,659 | 4/1969 | Waldron | 85/67 X |
| 3,651,653 | 3/1972 | Mouton, Jr. | 403/297 X |

FOREIGN PATENTS OR APPLICATIONS

| | | | |
|---|---|---|---|
| 1,045,292 | 6/1953 | France | 403/297 |
| 1,023,530 | 3/1966 | United Kingdom | 85/72 |
| 944,090 | 6/1956 | Germany | 85/72 |
| 421,406 | 11/1925 | Germany | 403/292 |
| 915,419 | 6/1946 | France | 403/292 |

*Primary Examiner*—Andrew V. Kundrat
*Attorney, Agent, or Firm*—Bell, Seltzer, Park & Gibson

[57] ABSTRACT

A self-locking dowel pin, suitable for use in assembling abutting furniture components, including a central portion and end portions of flexible material extending longitudinally outwardly from the central portion and being of initially transversely inwardly tapering configurations to provide reducing cross-sectional dimensions outwardly along the length thereof. The end portions each have a generally V-shaped cut out therein extending longitudinally inwardly from the end thereof for splitting of the end portions. A wedge-shaped expansion member is associated with each of the end portions and is of larger cross-sectional dimensions than the cut outs for being forced into and for expanding the end portions of flexible material to generally non-tapering configurations. Flange means extend generally transversely outwardly from outside surfaces of said end portions. Whereby, the dowel pin may be inserted into and extend through mating bores of abutting furniture components having predetermined like configurations only slightly larger than the dowel pin and the wedge-shaped expansion members may be force fitted into the V-shaped cut outs for expanding the end portions and for forcing the flange members into biting engagement with the surfaces of the bores for locking of the dowel pin within the mating bores for holding the furniture components in assembled condition.

1 Claim, 5 Drawing Figures

SELF-LOCKING DOWELL PIN

This invention is directed to a self-locking dowel pin suitable for use in assembling abutting furniture components.

BACKGROUND OF THE INVENTION

Heretofore, dowel pins have been utilized in assembling various components, such as abutting furniture components. These dowel pins, particularly for furniture components, have been primarily constructed of wooden material and required the use of machinery for the placing of these dowel pins within mating bores of abutting furniture components. The placing of dowels by these machines often resulted in splitting of furniture components and damage to the dowel pins themselves as well as other related problems.

SUMMARY OF THE INVENTION

Accordingly, it is the object of this invention to overcome the above problems and to provide a dowel pin which eliminates the necessity for the use of machinery for the placing of the dowel in mating bores of abutting furniture components or the like and which may be easily placed in such mating bores and which self locks in position for holding such abutting components in assembled condition.

By this invention it has been found that the above object may be accomplished by providing a dowel pin, preferably of molded, integral, high impact plastic, which is self-locking and which comprises a central portion and end portions of flexible material extending longitudinally outwardly from each end of the central portion and being of initially transversely inwardly tapering configurations to provide reducing cross-sectional dimensions outwardly along the lengths thereof. The end portions each have a generally V-shaped cut out therein extending longitudinally inwardly from the end thereof for splitting of the end portions. A generally wedge-shaped expansion member is associated with each of the end portions and is of larger cross-sectional dimensions than the cut outs for being force fitted into the end portions for expanding the end portions of flexible material to generally non-tapering configurations. Flange members extend generally transversely outwardly from the outside surfaces of the end portions.

With the above construction, the dowel pin may be inserted into and extend through mating bores of abutting furniture components having predetermined like configurations only slightly larger than the dowel pin and the wedge-shaped expansion members may be force fitted into the V-shaped cut outs for expanding the end portions and for forcing the flange members into biting engagement with the surfaces of the bores for locking of the dowel pin within the mating bores for holding the furniture components in assembled condition.

Further specific features of the construction of the self-locking dowel pin of this invention will become apparent from the further more detailed description of the preferred embodiment thereof.

BRIEF DESCRIPTION OF THE DRAWINGS

Some of the objects and advantages of this invention having been set forth, other objects and advantages will appear from the following description, when taken in conjunction with the accompanying drawings, in which.

DESCRIPTION OF PREFERRED EMBODIMENT

Figure 1:
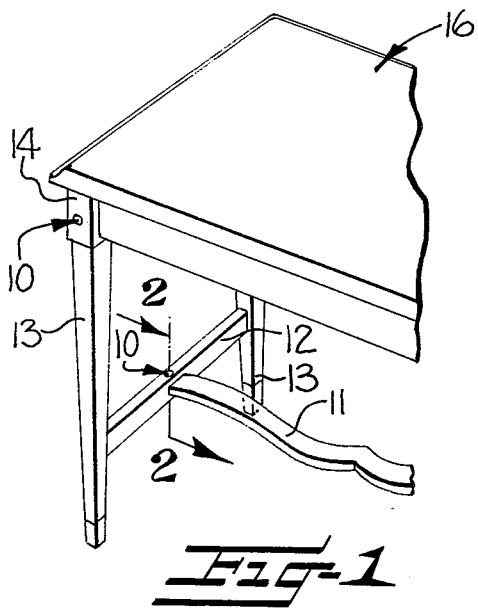
FIG. 1 is a perspective view of a portion of a furniture item, such as a table, which utilizes the dowel pin of this invention for assembling abutting furniture components.

Referring now to the drawings and as may be seen in FIG. 1, the self-locking dowel pin, generally indicated at 10, of this invention, is utilized for assembling abutting furniture components 11, 12 and 13, 14, 15 of a piece of furniture 16 which may be any desired piece of furniture, such as a table illustrated partially in FIG. 1. It is to be understood that the dowel pin 10 of this invention may be utilized for assembling any abutting component of furniture or other articles which has mating bores 20 and 21, as shown in FIG. 2.

Figure 4:
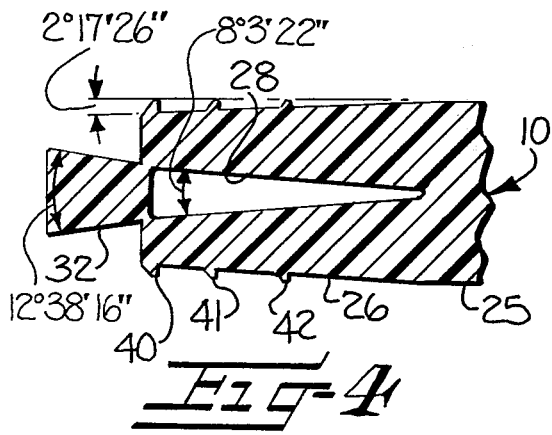
FIG. 4 is a partial cross-sectional view taken generally through one end portion of the dowel pin of FIG. 3 and generally along the line 4—4 of FIG. 3.

The dowel pin 10 comprises a central portion 25, preferably of elongate, predetermined, generally cylindrical configuration, and end portions 26 and 27 of flexible material extending longitudinally outwardly from each end of said central portion and being of initially transversely inwardly tapering configurations, preferably generally frusto-conical shape, to provide outwardly reducing cross-sectional dimensions along the lengths thereof, as may be clearly seen in FIG. 4. The central portion and end portions are preferably of a one-piece, molded, integral, high impact, flexible, plastic material, such as high impact styrene, for providing strength and flexibility to the dowel pin 10 and for allowing easy, inexpensive manufacture thereof.

Each of the end portions 26, 27 have a generally V-shaped cut out 28, 29 therein extending longitudinally inwardly from the end thereof for splitting of the end portions 26, 27.

Figure 2:
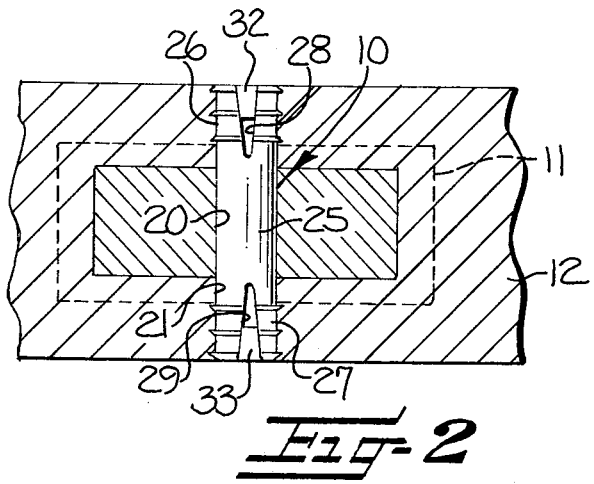
FIG. 2 is a cross-sectional view, taken generally along the line 2—2 of FIG. 1.
Figure 5:
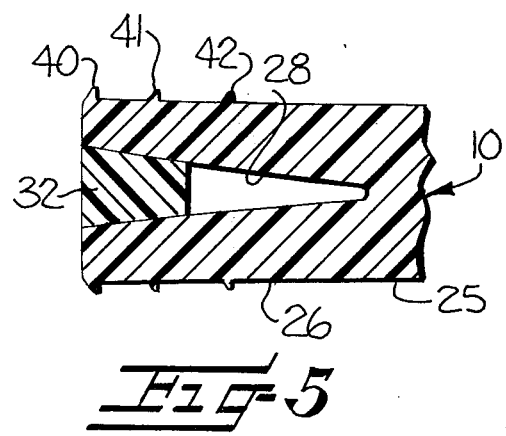
FIG. 5 is a view like FIG. 4 illustrating the wedge-shaped member force fitted into the cut out in one end portion of the dowel pin for expanding the end portion of the dowel pin.

A generally wedge-shaped expansion member 32, 33 is associated with each of the end portions 26, 27, respectively, and are of larger cross-sectional dimensions, as viewed in FIG. 4, than the cut outs 28, 29 for being force fitted into the end portions 26, 27, as shown in FIGS. 2 and 5, for expanding the end portions 26, 27 of the flexible material to generally non-tapering configurations of the same general predetermined preferred cylindrical configuration and cross-sectional dimensions as the central portion 25. These wedge-shaped expansion members 32, 33 may be constructed of the same material utilized for the integral central and end portions 25, 26, 27 of the dowel pin 10.

Figure 3:
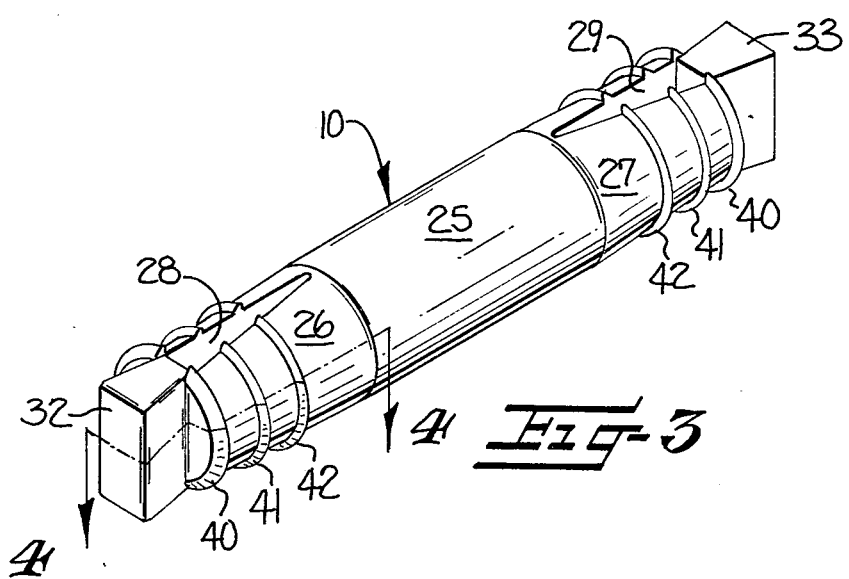
FIG. 3 is an enlarged, perspective view of the self-locking dowel pin of this invention.

As may be seen particularly in FIGS. 3 and 4, the forward ends of the wedge-shaped members 32, 33 include integral connections with the ends of the end portions 26, 27 so that the dowel pin 10, including the central portion 25 and end portions 26, 27 along with expansion members 32, 33, may be constructed of a one piece, molded, integral, high impact, flexible, plastic material, such as high impact styrene or the like, for providing ease in reducing of cost of manufacture. The integral connections between the expansion members 32, 33 and the end portions 26, 27 may be easily ruptured when the expansion members 32, 33 are forced into the cut outs 28, 29 for expanding the end portions 26, 27 of the dowel pin 10.

The dowel pin 10 further includes integral flange members 40, 41, 42 extending generally transversely outwardly from outside surfaces of the end portions 26, 27, respectively. These flange members are preferably spaced apart, inwardly facing, generally saw tooth shaped which extend circumferentially around the outside of the end portions 26, 27. Any number of such flange members may be utilized, but it is preferred to have a plurality of such flange members.

With the above construction, the dowel pin 10 may be inserted into and extend through, for example, mating bores 20, 21 of abutting furniture components 11, 12 having predetermined, like, cylindrical configurations slightly larger than the dowel pin 10 so that the wedge-shaped expansion members 32, 33 may be force fitted, from the positions illustrated in FIGS. 3 and 4, into the V-shaped cut outs 28, 29 for expanding the end portions 26, 27 of flexible material and for forcing the flange members 40, 41, 42 into biting engagement with the surfaces of the bores 20, 21 for locking the dowel pin 10 within the mating bores 20, 21 for holding the furniture components 11, 12 of the article of furniture 16 in assembled condition.

It has been found that a commercial embodiment of the above described dowel pin 10 may include the following angular relationships and specific construction.

An included angle for the sides of the V-shaped cut outs 28, 29 may be generally 8° 3' 22'' and the inward taper of the outwardly extending end portions 26, 27 with respect to a longitudinal tangential axis from the outer surface of the central portion 25 may be 2° 17' 26'', as illustrated in FIG. 4. With this angular relationship, it has been found preferred to have the sides of the expansion members disposed at an approximately 12° 38' 16'' included angle with respect to each other.

It is also preferable that the length of the flange members 40, 41, 42 be such that the outer saw tooth shaped tip thereof would be along the longitudinally extending tangential axis from the central portion 25 so that the flanges 40, 41, 42 will provide an outside cylindrical plane for the end portions 26, 27 which has the same cross-sectional dimensions as the central portion 25 and thus may be inserted easily within mating bores 20, 21 and after expansion will provide a strong biting engagement into the surfaces of such bores 20, 21. Thus, the flanges 40, 41, 42 will be of increasingly greater length depending upon their position along the outwardly extending end portions of inwardly tapering configuration, e.g. the flange 40 will be longer than the flange 41 and the flange 41 will be longer than the flange 42.

It is also preferable for the wedge-shaped expansion members 32, 33 to have cross-sectional dimensions such that a portion of the small end of the wedge member 32, 33 may be placed within the V-shaped cut outs 28, 29, respectively, without expanding the end portions 26, 27, as shown in FIGS. 3 and 4, for holding of the wedge-shaped members in position for subsequently force fitting them into the cut outs 28, 29. Additionally, the cross-sectional dimension of the large end of the wedge-shaped members 32, 33 should be such that when the wedge-shaped members 32, 33 are force fitted into the cut outs 28, 29 and the large end of the wedge-shaped members 32, 33 is flush with the outer end of the end portions 26, 27, the large end of the wedge-shaped members 32, 33 will add sufficient dimensions to the ends of the end portions 26, 27 so as to make the overall cross-sectional dimensions or diameters of the expanded end portions 26, 27 equal to the cross-sectional dimensions or diameter of the central portion 25 of the dowel pin 10.

It is to be understood that while the preferred configuration of the dowel pin 10 of this invention is generally cylindrical in overall shape, the dowel pin could have other configurations, such as square or rectangular, for being inserted into similarly configured bores of abutting furniture components or the like and utilize the specific novel features of this invention.

Thus it may be seen, that the present invention has provided a self-locking dowel pin which may be easily constructed and molded from high impact, flexible plastic material inexpensively and in volume and which provides a self-locking construction which may be easily inserted into mating bores of abutting furniture components or the like for self-locking within such bores to hold the abutting furniture components in assembled condition and which eliminates problems incumbent with previous dowel pin constructions.

In the drawings and specification there has been set forth a preferred embodiment of the invention and although specific terms are employed, they are used in a generic and descriptive sense only and not for purposes of limitation.

What is claimed is:

1. A self-locking dowel pin of one-piece, integral, high impact plastic construction suitable for use in assembling abutting furniture components comprising:
   a central portion of predetermined generally cylindrical configuration;
   end portions extending longitudinally outwardly from each of said central portions and being of initially generally frusto-conical configuration of outwardly reducing cross-sectional dimensions along the lengths thereof;
   a generally V-shaped cutout formed in each of said end portions and extending longitudinally inwardly from the ends thereof for splitting of said end portions and for rendering said end portions flexible;
   a generally wedge-shaped expansion member associated with each of said end portions and being of larger predetermined cross-sectional dimensions than said cutout for being force fitted into said end portions for expanding said flexible end portions to generally cylindrical configurations of generally the same cross-sectional dimension as said central portion, each of said expansion members including integral connections to the ends of said end portions which may be easily ruptured when said expansion members are forced into said cutouts for expanding said end portions; and
   a plurality of spaced-apart, inwardly facing, generally saw-tooth shaped flange members extending circumferentially around the outside of said end portions and being of varying heights from the outside surface of said end portions terminating along longitudinally-extending, tangential axes extending from said cylindrical central portion for defining a cylindrical plane around said end portions of generally the same cross-sectional dimensions as said central portion prior to expansion of said end portions by said wedge-shaped expansion members; whereby, said dowel pin may be inserted into and extend through mating cylindrical shaped bores of abutting furniture components which are slightly larger than the cross-sectional dimensions of the central portion of said dowel pin and said wedge-shaped expansion member may be force-fitted into said V-shaped cutouts for expanding said end portions and for forcing said flange members into biting engagement with the surfaces of the bores for locking of said dowel pin within the mating bores for holding the furniture components in assembled condition.

\* \* \* \* \*